(12) United States Patent
Djordjevic

(10) Patent No.: US 11,876,565 B2
(45) Date of Patent: Jan. 16, 2024

(54) GLOBAL QUANTUM COMMUNICATION NETWORKS

(71) Applicant: The University of Arizona, Tech Launch Arizona, Tucson, AZ (US)

(72) Inventor: Ivan Djordjevic, Tucson, AZ (US)

(73) Assignee: ARIZONA BOARD OF REGENTS ON BEHALF OF THE UNIVERSITY OF ARIZONA, Tucson, AZ (US)

( * ) Notice: Subject to any disclaimer, the term of this patent is extended or adjusted under 35 U.S.C. 154(b) by 172 days.

(21) Appl. No.: 17/375,865

(22) Filed: Jul. 14, 2021

(65) Prior Publication Data

US 2023/0155689 A1    May 18, 2023

Related U.S. Application Data

(60) Provisional application No. 63/051,757, filed on Jul. 14, 2020.

(51) Int. Cl.
    *H04B 10/70*        (2013.01)
    *H04B 10/118*      (2013.01)

(52) U.S. Cl.
    CPC .......... *H04B 10/70* (2013.01); *H04B 10/118* (2013.01)

(58) Field of Classification Search
None
See application file for complete search history.

(56) References Cited

U.S. PATENT DOCUMENTS

| | | | | |
|---|---|---|---|---|
| 2006/0239463 | A1* | 10/2006 | Young | H04B 10/70 380/263 |
| 2009/0074192 | A1* | 3/2009 | Beal | H04L 9/0858 380/278 |
| 2010/0299526 | A1* | 11/2010 | Wiseman | H04L 63/061 713/171 |
| 2017/0264373 | A1* | 9/2017 | Krovi | G06N 10/00 |
| 2018/0285761 | A1* | 10/2018 | Gambetta | G06N 99/00 |
| 2020/0169397 | A1* | 5/2020 | Li | H04B 10/524 |
| 2020/0204362 | A1* | 6/2020 | Li | H04L 9/0852 |
| 2021/0119786 | A1* | 4/2021 | Bucklew | H04B 10/70 |

OTHER PUBLICATIONS

Djordjevic, "Secure, Global Quantum Communications Networks", University of Arizona, Jul. 2020.

(Continued)

*Primary Examiner* — Darren E Wolf
(74) *Attorney, Agent, or Firm* — Grossman, Tucker, Perreault & Pfleger, PLLC

(57) ABSTRACT

The present disclosure is directed to systems and methods of providing the next generation of quantum enabled cyber security systems. Such systems include a quantum network of satellites that will provide global coverage. The quantum satellite network includes quantum subnetworks comprised of LEO satellites. Some of these LEO satellite-based quantum subnetworks are connected to a subnetwork of MEO satellites. The MEO satellite subnetworks may then be interconnected to the global network of GEO satellites. The LEO/MEO satellites may also be used to interconnect terrestrial quantum networks. Each quantum communication subnetwork may be based on the cluster state concept.

14 Claims, 5 Drawing Sheets

(56) References Cited

OTHER PUBLICATIONS

Djordjevic, "Physical-Layer Security and Quantum Key Distribution", University of Arizona, Sep. 15, 2019.
Duan, et al, "Long-distance quantum communication with atomic ensembles and linear optics" University Innsbruck, May 22, 2001.
Qiu, "Quantum communications leap out of the lab", Nature, vol. 508, Apr. 24, 2014.
Lo, et al, "Measurement device independent quantum key distribution", University of Toronto, May 28, 2012.
Lucamarini, et al., "Overcoming the rate-distance barrier of quantum key distribution without using quantum repeaters", Toshiba Research Europe Ltd., Nov. 16, 2018.
Fossie, et al, Improvement of continuous-variable quantum key distribution systems by using optical preamplifier, Thales Research & Technology, Dec. 22, 2008.
Qu, et al, "Four-Dimensionally Multiplexed Eight-State Continuous-Variable Quantum Key Distribution Over Turbulent Channels", IEEE Photonics Journal, vol. 9, Nov. 6, Dec. 2017.
Ralph, "Continuous Variable Quantum Cryptography", The Australian National University, Jul. 22, 1999.
Djordjevic, "On the Discretized Gaussian Modulation (DGM)-Based Continuous Variable-QKD", Apr. 27, 2019.
Djordjevic, "Optimized-Eight-State CV-QKD Protocol Outperforming Gaussian Modulation Based Protocols", IEEE Photonics Journal, vol. 11, No. 4, Aug. 2019.
Djordjevic, Hybrid QKD Protocol Outperforming Both DV and CV-QKD Protocols, IEEE Photonics Journal, vol. 12, No. 1, Feb. 2020.
Bernstein, et al, "Post-Quantum Crytography", Chicago and Darmstadt, Dec. 2008.
Elliott, et al, "Current status of the DARPA quantum network" SPIEDigitalLibrary.org/conference-proceedings-of-spie, May 25, 2005.
Sasaki, et al, "Field test of quantum key distribution in the Tokyo QKD Network", National Institute of Information and Communication Technology, Mar. 10, 2011.
Alléaume, et al., "Using quantum key distribution for cryptographic purposes: a survey", Telecom ParisTech & CNRS, LTCI, Dec. 4, 2014.
Nagayama, et al, IKE for IPsec with QKD, Keio University, Keio University.
Mink, et al, "Quantum Key Distribution (QKD) and Commodity Security Protocols: Introduction and Integration", International Journal of Network Security & Its Applications (IJNSA), vol. 1, No. 2, Jul. 2009.
Briegel, "Cluster States", Compendium of Quantum Physics, Jul. 25, 2009.
Gilbert, et al, "Efficient Construction of Photonic Quantum Computational Clusters", Quantum Information Science Group, Dec. 14, 2005.
Pan, et al, "Secret key distillation over a pure loss quantum wiretap channel under restricted eavesdropping", University of Arizona, Dec. 27, 2020.
Pan, et al, "Security of Satellite-Based CV-QKD under Realistic Assumptions," 2020 22nd International Conference on Transparent Optical Networks (ICTON), 2020.
Wang, et al, "Employing Bessel-Gaussian Beams to Improve Physical-Layer Security in Free-Space Optical Communications", IEEE Photonics Journal, vol. 10, No. 5, Sep. 2018.
Wang, et al, "Laser beam propagation effects on secure key rates for satellite-to-ground discrete modulation CV-QKD", University of Arizona, Jul. 2, 2019.

\* cited by examiner

GLOBAL QUANTUM COMMUNICATION NETWORKS

TECHNICAL FIELD

The present disclosure relates to global quantum communications networks.

BACKGROUND

The quantum communication (QuCom) employs the quantum information theory concepts to realize the distribution of keys with verifiable security, commonly referred to as quantum key distribution (QKD), where security is ensured by fundamental laws of physics as opposed to unproven mathematical assumptions employed in computational security-based cryptography. Despite the appealing features of QuComs, there are some fundamental and technical challenges that need to be addressed prior to its widespread applications. For instance, both rate and distance of QuCom are fundamentally limited by the channel loss, which is specified by the rate-loss tradeoff. To overcome the rate-distance limit of discrete variable (DV)-QKD protocols, two approaches have been pursued recently: (i) development of quantum relays and (ii) the employment of the trusted relays. The quantum relays require the use of long-duration quantum memories and high-fidelity entanglement distillation. On the other hand, the trusted-relay methodology assumes that the relay between two users can be trusted; unfortunately, this assumption is difficult to verify in practice. The measurement device independent (MDI)-QKD approach, was able to close the detection loopholes; however, its secret-key rate (SKR) is still bounded by O(T)-dependence (with T being transmissivity). Recently, the twin-field (TF) QKD has been proposed to overcome the rate-distance limit, whose SKR scales with the square-root of transmittance, which represents a promising approach to extend the transmission distance. Another key limitation of DV-QKD is the deadtime of the single-photon detectors (SPDs), which limits the baud rate and consequently the SKR. To solve for this problem, the continuous variable (CV)-QKD can be used instead, which employs the homodyne/heterodyne detection instead and thus does not exhibit the SPDS' deadtime limitation problem. In particular, the discrete modulation (DM)-based CV-QKD protocols offer much better reconciliation efficiency compared to that for Gaussian modulation (GM)-based CV-QKD protocols. Unfortunately, the security proofs of DM-based CV-QKD schemes for collective and coherent attacks are still incomplete. An alternative approach to QKD is the post-quantum cryptography (PQC). The PQC is typically referred to various cryptographic algorithms that are thought to be secure against any quantum computer-based attack. Unfortunately, the PQC is also based on unproven assumptions and some of the PQC algorithms will be broken in future by developing more sophisticated quantum algorithms.

Modern classical communication networks consist of multiple nodes connected by various types of channels, including free-space optical (FSO) links, optical fibers, ground-satellite links, wireless RF, and coaxial cables. Such a heterogeneous architecture would be equally important for QCNs as quantum nodes may access a QCN by different kinds of channels. Indeed, quantum communications have been individually validated in free-space, optical fibers, and between a satellite and a ground station, but a combined heterogeneous QCN employing multiple types of channels remains elusive. Unlike in the point-to-point communication case, the fundamental quantum communication rate limits are not well known even for the simplest broadcast and multiple-access channel settings. The QKD can also be used to establish QKD-based campus-to-campus virtual private network employing IPsec protocol as well as to establish the network setup for using transport-layer security (TLS) based on QKD. However, all these networks employ the dark fiber infrastructure. Moreover, the future quantum networks should support different applications than QKD including quantum teleportation, entanglement distribution, distributed quantum computing, distributed quantum sensing, etc.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Although the following Detailed Description will proceed with reference being made to illustrative embodiments, many alternatives, modifications and variations thereof will be apparent to those skilled in the art.

DETAILED DESCRIPTION

The systems and methods disclosed herein include entangling disconnected terrestrial quantum computing networks (QCNs) coupled through LEO satellite quantum networks to form a heterogeneous satellite-terrestrial QCN. Such systems provide an important step in enabling ultimate security for future network infrastructure in the world. The proposed QCNs will be robust against channel impairments, over heterogeneous links. Moreover, the proposed QCNs will beneficially provide an unprecedented security level for 5G/6G and beyond wireless networks, Internet-of-Things (IoT), optical networks, and autonomous vehicles, etc.

The systems and methods disclosed herein implement the multipartite QCN by employing the cluster state based concept. The systems and methods disclosed herein may be used to: (i) perform distributed quantum computing, (ii) teleport quantum states between any two nodes in the network, and (iii) enable next generation of cyber security systems. The cluster states can be described using the stabilizer formalism and as such they can easily be certified by simple syndrome measurements. In this formalism, the cluster states can be interpreted as codewords of corresponding quantum error correction code, and corresponding errors can be corrected by simple syndrome decoding, among others. By performing X, Y and/or Z measurements (by using X-basis and Z-basis, respectively) on properly selected nodes, Einstein, Podolsky and Rosen (EPR) pairs (also known as Bell states) may be established between any two nodes in the network. Moreover, multiple EPR pairs can be established simultaneously. The systems and methods disclosed herein include a cluster state-based quantum network of satellites that enables global coverage. The quantum satellite network may be composed of quantum subnetworks comprised of LEO satellites. Some of these LEO satellite-based quantum subnetworks may be connected to a subnetwork of MEO/GEO satellites. The LEO satellites may also be used to interconnect terrestrial cluster state-based quantum networks. This quantum global network may also be used to distribute the entangled states for quantum sensing applications and enable distributed quantum computing on a global scale. SDN concepts may be used to reconfigure the proposed QCN.

Figures 1, 1A:
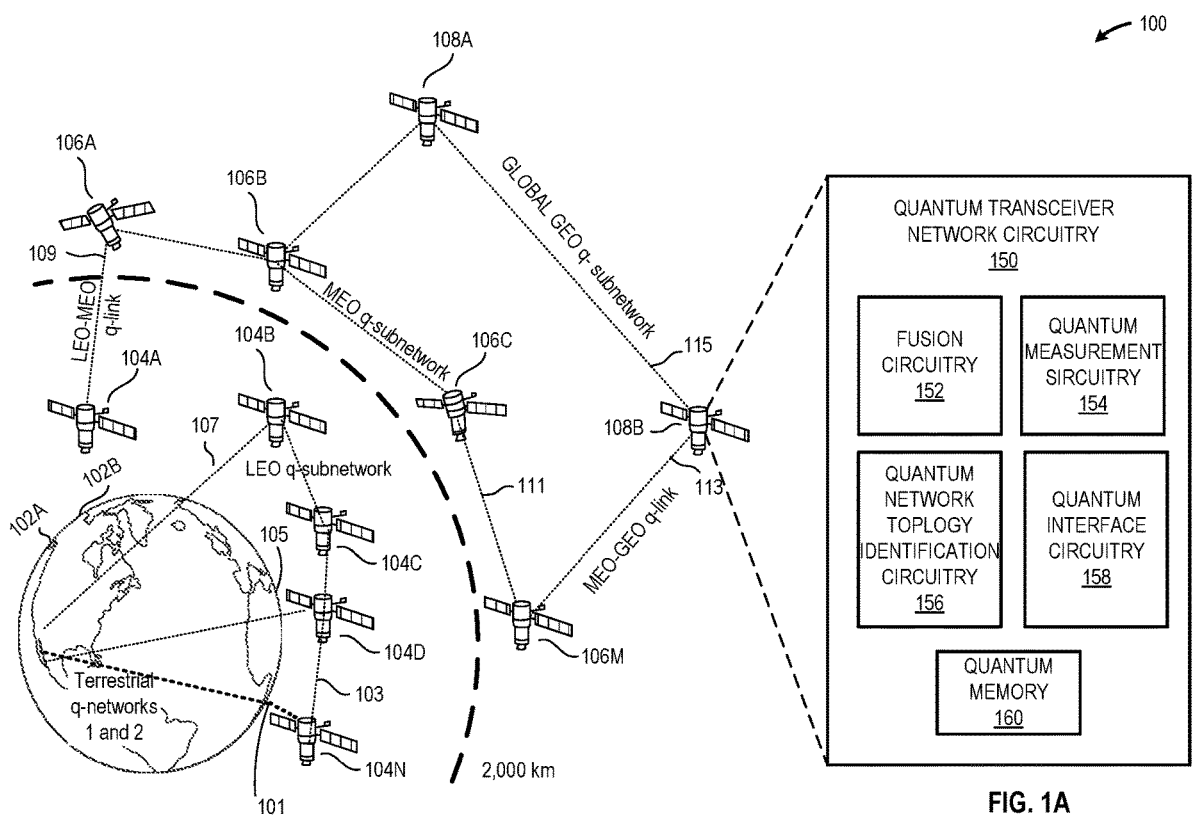
FIG. 1 illustrates a global quantum network according to various embodiments of the present disclosure.
FIG. 1A illustrates quantum network controller circuitry according to several embodiments of the present disclosure.

FIG. 1 illustrates a global quantum network 100 according to various embodiments of the present disclosure. In embodiments described herein, various nodes of the network 100 may be used to form various global quantum communications network (QCNs) having a desired topology. The global network includes a plurality of terrestrial network nodes 102A, 102B, a plurality of low-earth orbit (LEO) satellite network nodes 104A, 104B, . . . , 104N, a plurality of medium-earth orbit (MEO) satellite network nodes 106A, 106B, . . . , 106M, and a plurality of high-earth (e.g., geosynchronous) orbit (GEO) satellites 108A, 108B. The plurality of network nodes may form a plurality of quantum subnetworks, illustrated as 101, 103, 105, 107, 109, 111, 11, and 115. Quantum links between satellite nodes, and between ground-based nodes and satellite nodes, may be established, for example, using free-space optical (FSO) communications. Quantum links between ground-based nodes may be established, for example, using fiber-based connections, free-space optical connections, etc. Of course, the number and types of satellites and ground based nodes are illustrated in FIG. 1 only as an example.

To enable the next generation of quantum communication networking, disconnected terrestrial cluster states based QCNs are coupled through the LEO satellite (cluster state) quantum network, thus providing global coverage. In embodiments described herein, the QCN may be established such that ground nodes communicate with LEO satellite nodes. This may enable, for example, a QCN that is relatively robust against turbulence since the LEO satellite-to-ground links FSO links exhibit a vertical downlink profile through vacuum followed by a turbulence layer with strength that is altitude-dependent.

When two quantum node are coupled together, this is referred to herein as a "cluster". Cluster states belong to the class of the graph states, which also include Bell states, GHZ states, W-states, and various entangled states used in quantum error correction. When the cluster C is defined as a connected subset on a d-dimensional lattice, it obeys the set of eigenvalue equations:

$$S_a|\phi\rangle_c = |\phi\rangle_c \quad (1)$$

where $$S_a = X_a \otimes Z_b \quad (2)$$

$$b \in N(a) \text{ in neighborhood of } a \in C \quad (3)$$

To create a 2-D cluster state, the approach employs linear states, generated by spontaneous parametric down conversion (SPDC), local unitaries, and type I fusion to create the desired 2-D cluster state. Once 2-D cluster state of nodes is created, Y and Z measurements may be selected to create the EPR pair between arbitrary two nodes in the quantum network, as described below.

FIG. 1A illustrates quantum network controller circuitry 150 ("network controller 150") according to several embodiments of the present disclosure. The network controller 150 is generally configured to establish (QCN) among a plurality of quantum nodes, and an instance of the network controller 150 may be associated with each network node of FIG. 1 (FIG. 1A being illustrated by example as being associated with network node 108B). The network controller 150 is generally configured to establish quantum connections between two or more node pairs, and forming selected sub-network topologies by forming and removing quantum connections between nodes. The network controller 150 includes fusion circuitry 152 generally configured to establish quantum entanglement between two or more node pairs. The network controller 150 also includes quantum measurement circuitry 154 generally configured to perform quantum measurements on qubits associated with one or more nodes to remove or bypass a particular node from a subnetwork. The network controller 150 also includes network topology identification circuitry 156 generally configured to determine a desired network topology for a given operating environment, and to utilize the fusion circuitry 152 and/or quantum measurement circuitry to form a selected network topology from a given set of quantum-capable network nodes. In some embodiments, the network controller may also include quantum interface circuitry 158 generally configured to provide an interface between stationary qubits and flying (mobile) qubits. The stationary qubits maybe stored in a quantum memory 160. The quantum interface circuitry 158 may couple network segments of different implementation types, for example, solid-state spin states, superconducting qubits, and ultra cold atoms, etc. (in contrast to entanglement distribution that relies on flying quantum information encoded on photons).

Figure 2:
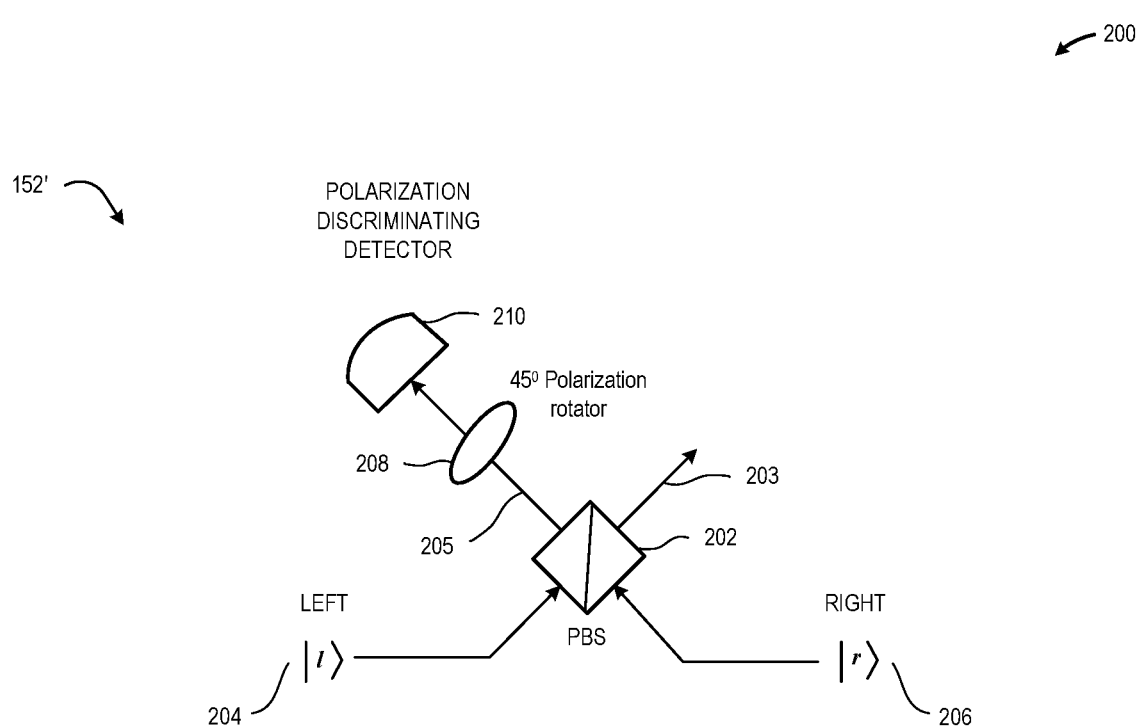
FIG. 2 illustrates fusion circuitry according to one embodiment of the present disclosure.

FIG. 2 illustrates fusion circuitry 152' according to one embodiment of the present disclosure. The fusion circuitry 152' is generally configured to provide quantum entanglement of a pair of qubits (quantum bits). As used herein, "fusion" means quantum entangling of two independent quantum nodes, belonging to the different network segments, thus forming a more complex quantum network. The fusion circuitry 152' includes polarization beam splitter (PBS) circuitry 202 configured to receive a first qubit 204 (labeled $|l\rangle$) and a second qubit 206 (labeled $|r\rangle$). The first and second qubits 204, 206 may be generated at independent nodes, and generally represent quantum photons having a randomly generated polarization. It should be noted that fusion circuitry 152' is provided as an example, however, when quantum information is not encoded on polarization states, other fusion circuitry may be used. In polarization states-based example, the polarization of the qubits 204 and 206 may include a horizontal polarization, a vertical polarization, or superposition states. The fusion circuitry 152' effectively entangles the independent arbitrary qubits$|l\rangle$ and $|r\rangle$.

The PBS circuitry 202 generally operates as follows:

$$U_{PBS} = A_r|V_l^{(out)}\rangle\langle V_l^{(in)}| + A_r|V_r^{(out)}\rangle\langle V_r^{(in)}| + A_l|H_l^{(out)}\rangle\langle H_r^{(in)}| + A_l|H_r^{(out)}\rangle\langle H_l^{(in)}|,$$

where $A_r$ and $A_t$ are reflection and transmission amplitude coefficients, respectively. In other words, the vertical photon is reflected by the PBS circuitry 202, while horizontal photon is transmitted through the PBS circuitry 202. With the photons present at both left and right input ports, there are four possible outcomes, each occurring with probability 0.25. Two outcomes correspond to the desired fusion operators$|0\rangle\langle 00| \pm |1\rangle\langle 11|$, and the success probability of the fusion is 0.5. When a single photon is detected by the detector, the successful fusion is declared. On the other hand, when 0 or two photons get detected we know that the fusion resulted in failure, and both qubits are cut from their respective clusters. Therefore, the fusion failure is similar to measuring both qubits in Z-basis (after which the measured qubits get removed from the cluster).

The fusion circuitry 152' may also include a polarization rotator device 208 coupled to output 205. The polarization rotator device 208 is generally configured to rotate the polarization axis of a linearly polarized light beam by desired angle. In example embodiments, the polarization rotator device 208 may impart a 45 degree polarization rotation to the photon at output 205. The fusion circuitry 152' also includes polarization discriminating detector (PDD) circuitry 210. The PDD circuitry 210 is generally a single photon detector generally configured to detect the presence of a photon after 45° polarization rotation. Once the single photon is detected by PDD circuitry 210, the two input qubits are entangled, thus forming a quantum link between the respective nodes associated with qubits 204 and 206.

With both photons 204 and 206 present, there are four possible outcomes, each occurring with a probability of 0.25. Two outcomes correspond to a desired fusion operation (quantum entanglement), and thus a successful outcome has a probability of 0.5. When a single photon is detected by the PDD circuitry 210, the PDD circuitry 210 signals a successful fusion. Other types of fusion circuitry can be alternatively used, depending on the degree of freedom being used to encode the quantum information (such as energy-time, OAM, space position, etc.). The fusion circuitry 152' may be deployed in each of the network nodes illustrated in FIG. 1 to enable formation of desired quantum network topologies, as described below. The fusion circuitry 154' may be configured to perform measurement bases including, for example, X, Y, Z, and Bell states measurement bases.

Figure 3A:
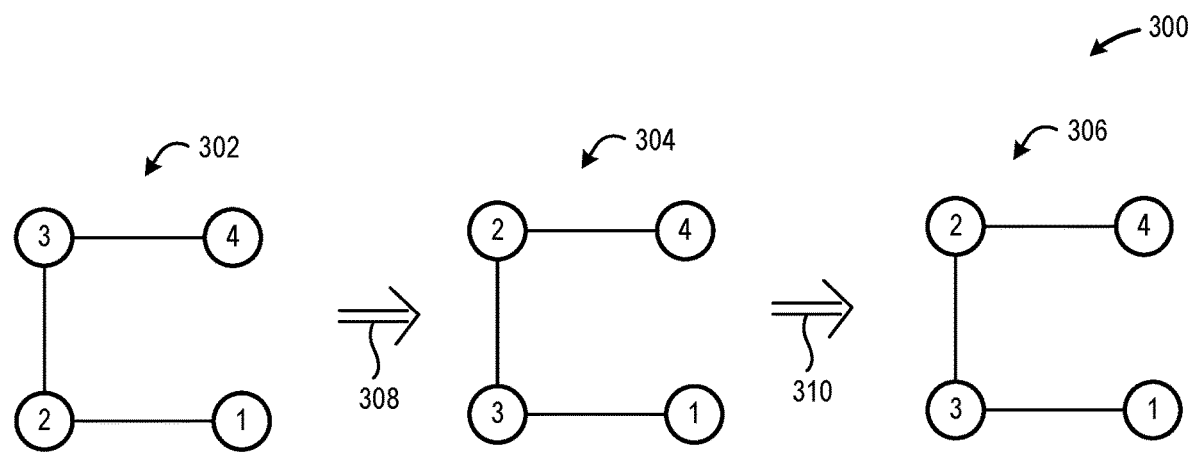
FIGS. 3A, 3B, 3C and 3D illustrate examples of forming various quantum network topologies according to various embodiments of the present disclosure.

FIGS. 3A, 3B, 3C and 3D illustrate examples of forming various quantum network topologies according to various embodiments of the present disclosure. The circled numbers (e.g., 1, 2, 3, 4, 5, etc.) and circled letters (e.g., a, b, c, d, e, etc.) represent quantum network nodes. In the example of FIG. 3A, a starting "Π-shape" topology 302 may exits having quantum nodes 1, 2, 3 and 4, where nodes 1-2, 2-3 and 3-4 are quantum entangled, respectively. In this example, it may be desired to form a "box-shape" topology 306 (in which nodes 1 and 4 become quantum entangled). One or more intermediate steps may be chosen to arrive at the desired topology 306. For example, a first intermediate step 308 may be used to form an intermediate topology 304. The first intermediate step may include, for example, "relabeling" qubits on nodes 2 and 3 (performing a "swap" operation of nodes 2 and 3) to form intermediate topology 304. A second intermediate step 310 may include, for example, performing a proper single-qubit operation on nodes 2 and 3, effectively establishing a quantum link between nodes 1 and 4. The proper single-qubit operation may be performed, for example, using Hadamard-type gate circuitry (which may be included with the circuitry 156) to map the basis states into superposition states.

Figure 3B:
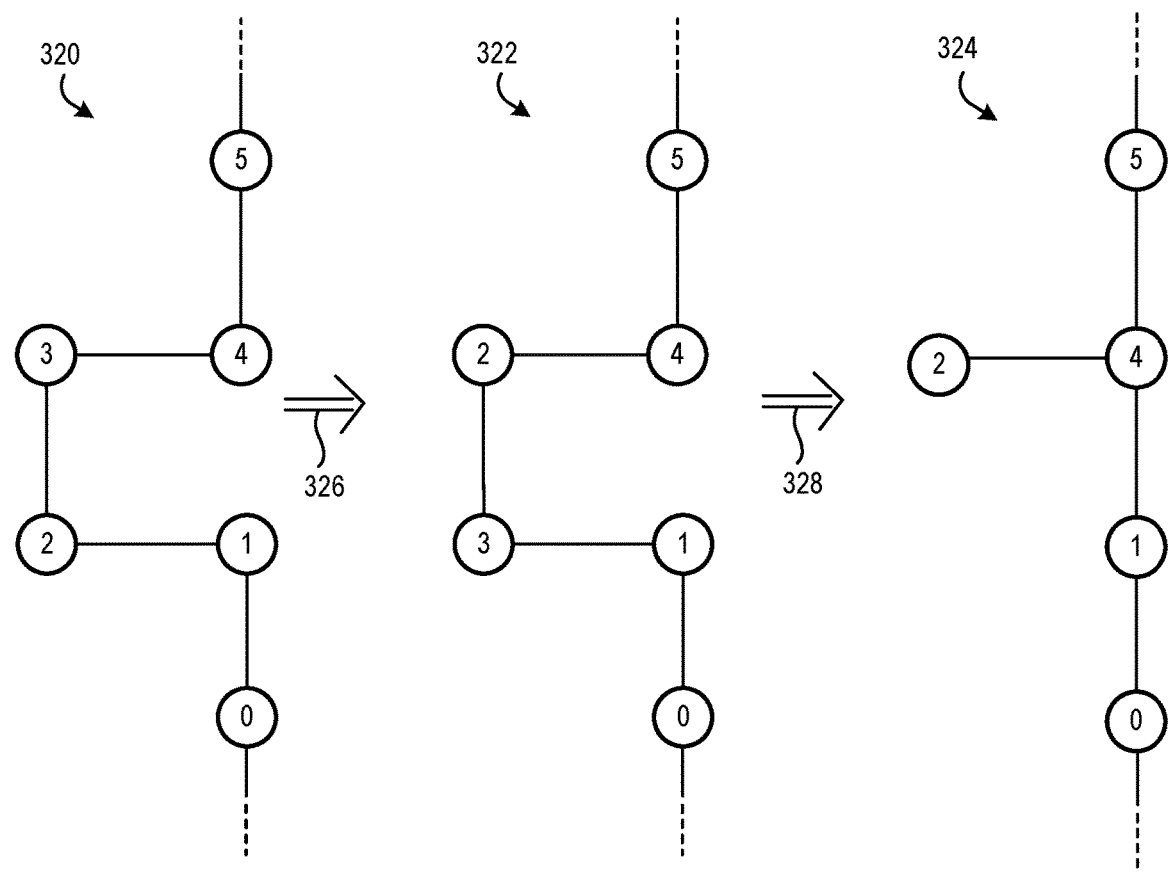

FIG. 3B illustrates an example of forming a "T-shaped" quantum network topology. The initial topology is illustrated at 320, which is a linear chain of entangled states, and operation 326 (which may be a combination of operations 308 and 310, described above) generates intermediate topology 322. Operation 328 may include performing a measurement (e.g., Z measurement) of qubits on node 3 to remove the link between nodes 2 and 3, and remove the link between nodes 1 and 3, thus forming the "T-shaped" topology 324.

Figure 3C:
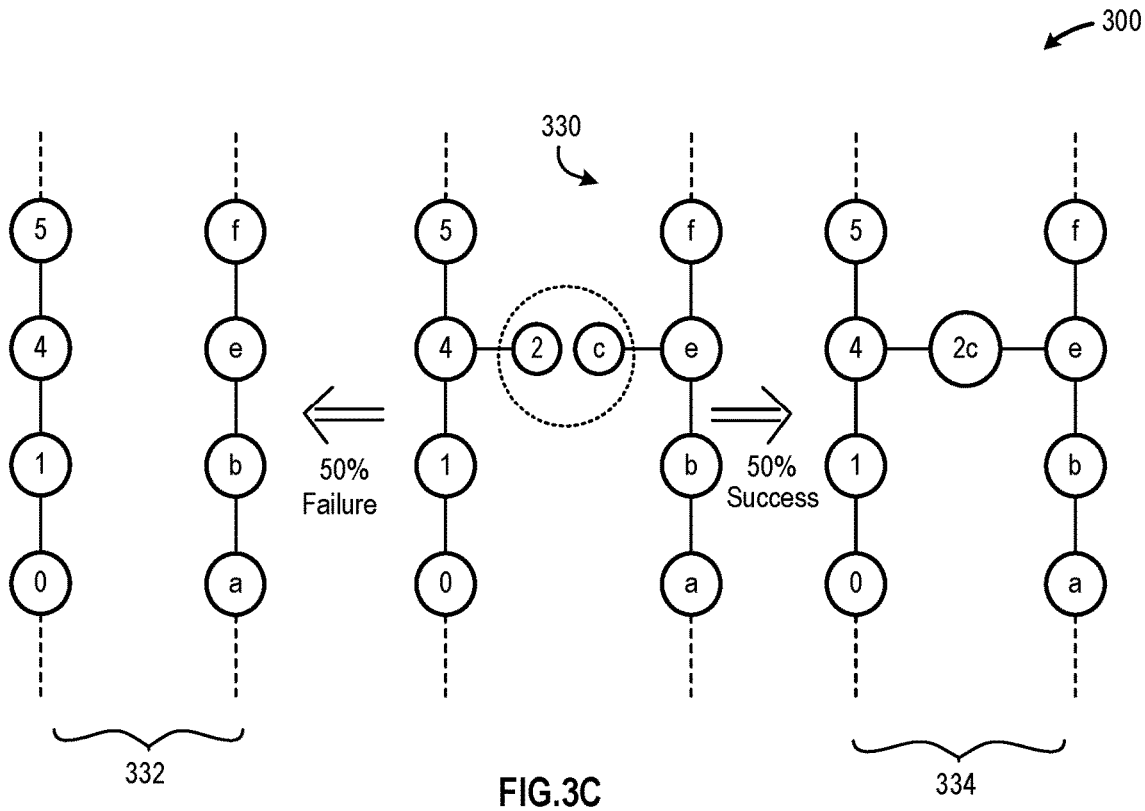

FIG. 3C illustrates an example of forming an "H-shaped" quantum network topology. In this example, the initial topology 320 includes two independent "T-shaped" quantum networks (0, 1, 2, 4, 5; and a, b, c, e, f). This example illustrates that successful quantum entanglement between nodes occurs with 0.5 probability, where a successful quantum entanglement of nodes 2 and c (334) occurs with 50% probability and a failed quantum entanglement of nodes 2 and c (332) occurs with 50% probability. The circuitry 156 may be configured to repeat attempts to establish quantum entanglement between nodes, given the probability of success.

Figure 3D:
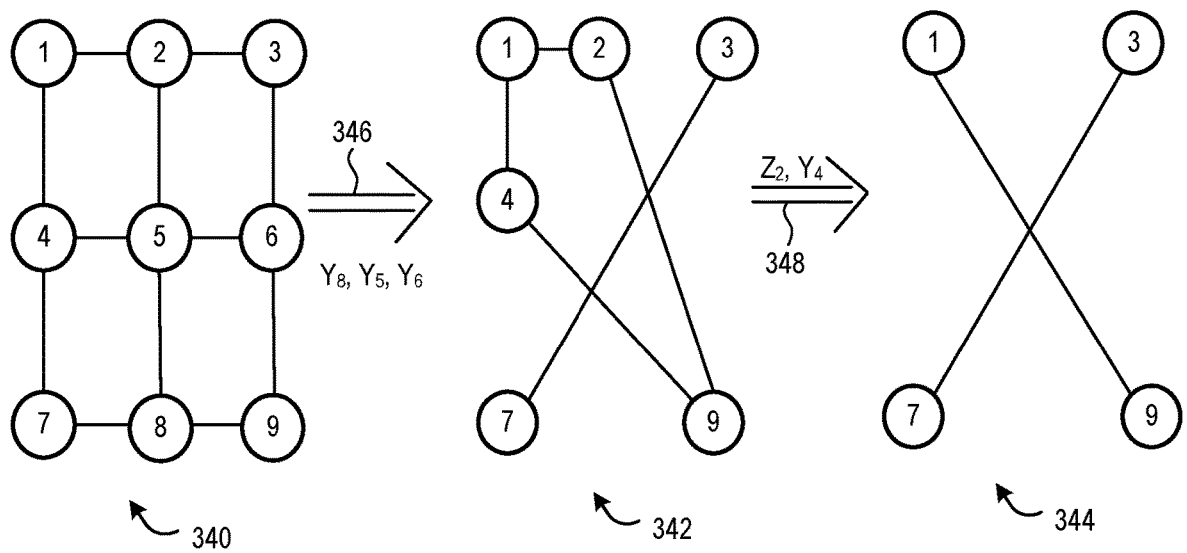

FIG. 3D illustrates another example of forming a desired quantum network topology. In this example, the initial topology is illustrated at 340 and the desired topology is illustrated at 344. A first intermediate step 346 includes performing a Y measurement on the qubits associated with nodes 8, 5 and 6, thereby removing those nodes from the initial topology 340 to form intermediate topology 342. A second intermediate step 348 includes performing a Z measurement on node 2 and a Y measurement on node 4, thus removing nodes 2 and 4 and forming the desired topology 344, in which entangled pairs between nodes 1 and 9, 3 and 7 are created.

The examples illustrated in FIGS. 3A-3D illustrate 2-D cluster quantum network of desired shape. Given that the 2-D cluster state is universal (meaning that arbitrary quantum algorithms may be used), in some embodiments, the same network architecture topology described above for QCN may be used for distributed quantum computing. In addition, in some embodiments, one or more nodes may be include multiple instances of fusion circuitry 152 and quantum measurement circuitry 154, thus enabling such a node to form part of several concurrent (independent or dependent) active quantum networks. Such embodiments may provide, for example, the ability for a node to simultaneously perform QCN and distributing quantum computing. In addition, when several 2-D cluster states are run in parallel on the same set of network nodes, a QCN may be reconfigured as needed.

Figure 4:
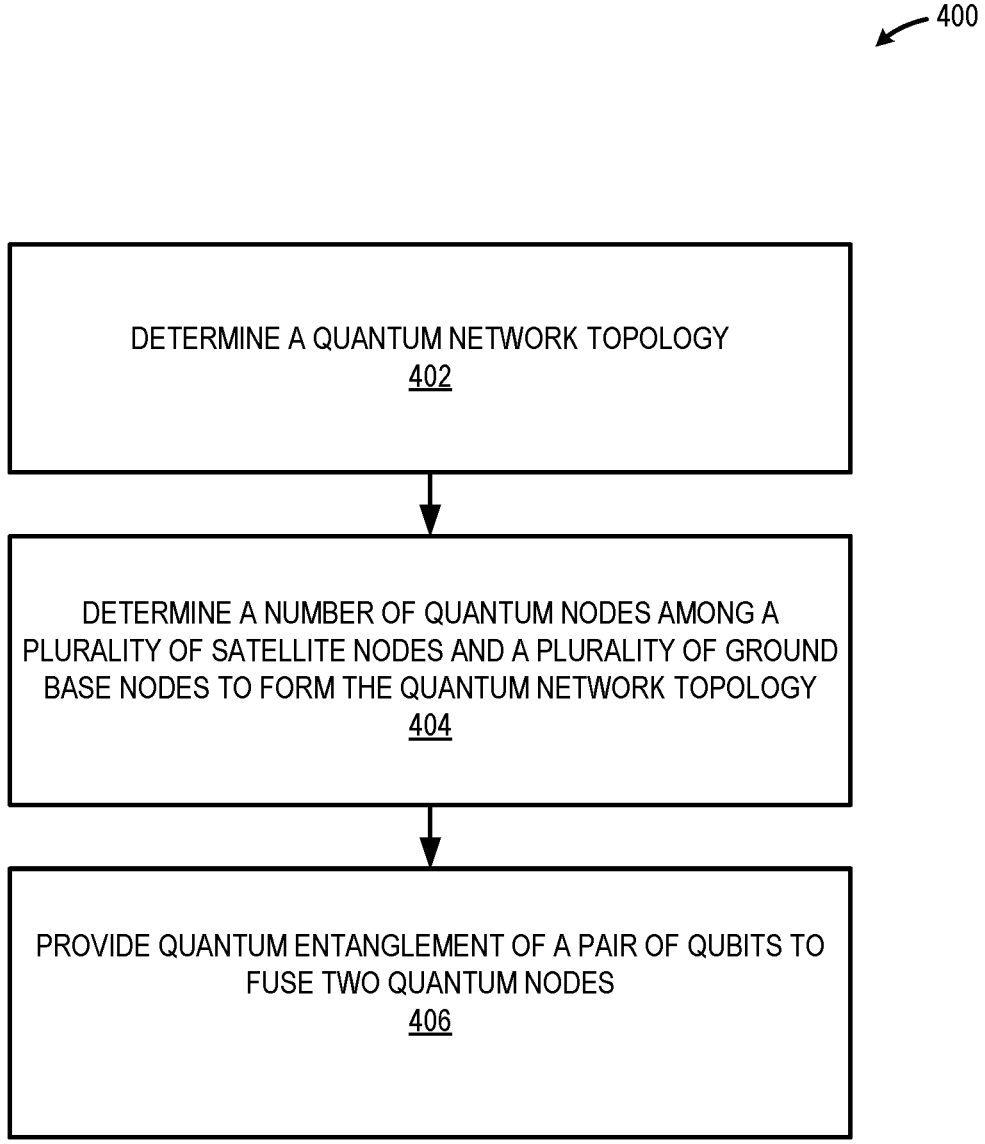
FIG. 4 illustrates a flowchart of QCN operations according to one embodiment of the present disclosure.

FIG. 4 illustrates a flowchart 400 of QCN operations according to one embodiment of the present disclosure. Operations of this embodiment include determining the structure of a quantum network topology 402. The structure of a quantum network topology may be determined, for example, based on the number of quantum nodes (ground-based and satellite) available, and based on a desired quantum networking task (e.g., forming a QCN for multiple, worldwide corporate offices, quantum computing operations, etc.). Operations of this embodiment also include determining a number of quantum nodes, among a plurality of satellite nodes and a plurality of ground-based nodes, to form the structure of the quantum network topology 404. In this regard, a minimum number of nodes may be selected for a given task. Operations may also include providing quantum entanglement of a pair of qubits to fuse two quantum nodes 406. The operations 406 may be repeated for each node in a selected quantum network topology.

While FIG. 4 illustrates various operations according to one embodiment, it is to be understood that not all of the operations depicted in FIG. 4 are necessary for other embodiments. Indeed, it is fully contemplated herein that in other embodiments of the present disclosure, the operations depicted in FIG. 4, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

In some embodiments, the network controller circuitry 150 may be implemented using software-defined network (SDN) techniques. For example, known SDN techniques and protocols provide for a separation of control plane functionality and data plane functionality, manage network services through abstraction of higher-level functionality, and the ability to implement new applications and algorithms efficiently. Such SDN techniques have been studied to enable the coexistence of classical and quantum communication channels. Accordingly, the network controller circuitry 150 may be implemented using SDN-based QCN techniques, and such an implementation may include an application layer, control layer, and QCN layer. In such embodiments, a user may communicate one or more network topology formation requests from the application layer (using, for example, a northbound interface (not shown) of the network controller). The network controller, being implemented with SDN protocols and techniques, may allocate QCN resources using a global map through, for example a southbound interface (not shown). In embodiments, the QCN layer may be composed of dense wavelength division multiplexing (DWDM), FSO/single-mode fiber (SMF)/few-mode fiber (FMF) links, and QCN nodes. Any two nodes in a QCN may communicate through either a dedicated SMF/FSO/FMF link or a wavelength channel. The network controller 150 may also determine a sequence of measurements to be performed in order to establish desired EPR pairs. The network controller 150 may also be adapted for both application requirements and link conditions, to efficiently manage time-varying channel conditions over heterogeneous links.

As may be appreciated, terrestrial nodes may form part of a wireless network using cellular wireless communications protocols (e.g., 5G+/6G (and beyond)). The teachings of the present disclosure may be utilized to provide quantum-level security to such wireless network connected to a quantum subnetwork. For example, by connecting 5G+/6G base stations to the nodes in the QCNs described herein, unconditional security may be extended to wireless networks. By organizing the base stations in a quantum optical mesh network and employing hybrid QKD-post-quantum cryptography (PQC) techniques, unconditional security may be provided to a large number of users. The Internet-of-Things (IoT) architecture will comprise widely distributed nodes connected via different types of channels to enable new functionalities in communication, sensing, and computing. Communication security in such a giant network is of paramount importance. QCNs as described herein may provide unconditional physical-layer security of the IoT, given that the QCNs described herein will allow arbitrary two nodes to securely transmit data at high rate via an optical link. The security of such a network will not rest upon the trusted-node assumption, and a compromised node will not affect the security of other nodes. As such, the QCNs described herein may provide a substantially stronger security level for the IoT.

To provide global coverage, disconnected terrestrial QCNs may be coupled through the LEO satellite quantum network. It has been demonstrated that a Bessel-Gaussian (BG) beam, carrying an OAM mode, exhibits better tolerance to atmospheric turbulence effects compared to Gaussian beams, for distances up to a few kilometers. However, for LEO satellite-to-ground QuCom links, BG beams diffract much faster than Gaussian beams for such long-distance applications. Accordingly, to enable robustness against turbulence encountered by FSO links, in one embodiment a quantum satellite network may be configured to communicate to ground nodes only through the LEO satellite-to-ground links, exhibiting vertical downlink profile through vacuum followed by a turbulence layer with strength that is altitude-dependent. Such nodes may include, for example, adaptive optics (AO) subsystems (which may include, for example, wavefront sensor (WFS) circuitry, deformable mirrors, adaptive LDPC coding, etc.) to enable more effective management of atmospheric turbulence effects. Of course, MEO/GEO satellites-based QCNs may be created at greater distances than LEO QCNs, for example, to provide planetary quantum network coverage, and thus implement quantum Internet.

To extend the transmission distance between two neighboring nodes, the following approaches may be used: hybrid QKD-PQC concept, restricted eavesdropping concept, and quantum error correction-based repeaters.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the terms "system" or "circuitry" may refer to, for example, software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., non-volatile) in memory devices.

As used in any embodiment herein, the term "circuitry" may comprise, for example, singly or in any combination, hardwired circuitry, programmable circuitry such as computer processors comprising one or more individual instruction processing cores, state machine circuitry, and/or firmware that stores instructions executed by programmable circuitry or future computing paradigms including, for example, massive parallelism, analog or quantum computing, hardware embodiments of accelerators such as neural net processors and non-silicon implementations of the above. The circuitry may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more mediums (e.g., non-transitory storage mediums) having stored therein, individually or in combination, instructions that when executed by one or more processors perform the methods. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software executed by a programmable control device.

Thus, the present disclosure is directed to systems and methods of providing the next generation of quantum enabled cyber security systems. Such systems include a quantum network of satellites to provide global coverage. The quantum satellite network is composed of quantum subnetworks comprised of LEO satellites. Some of these LEO satellite-based quantum subnetworks are connected to a subnetwork of MEO satellites. The MEO satellite subnetworks may then be interconnected to the global network of GEO satellites. The LEO/MEO satellites may also be used to interconnect terrestrial quantum networks. Each quantum communication subnetwork may be based on the cluster state concept.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of We claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

What is claimed is:

1. A method of forming a quantum communications network (QCN), comprising:
   determining, by one or more processors, a number of quantum nodes, among a plurality of ground-based nodes and a plurality of satellite nodes, to form a quantum network topology;
   quantum entangling, by quantum fusion circuitry, of a pair of qubits, each qubit associated with a respective quantum node that are each included with the quantum network topology;
   coupling two quantum nodes, belonging to different networking segments, based on quantum entanglement of a respect qubit of each respective node; and
   establishing the QCN by creating a 2-D cluster based on the coupling of at least two quantum nodes.

2. The method of claim 1, wherein the number of quantum nodes is based on a task using the QCN.

3. The method of claim 1, wherein the plurality of satellite nodes include a plurality of low-earth orbit (LEO) satellite nodes, a plurality of middle-earth orbit (MEO) satellite nodes, and a plurality of geosynchronous orbit (GEO) satellite nodes, wherein the plurality of ground-based nodes are coupled to the plurality of LEO satellite nodes.

4. The method of claim 1, wherein the quantum fusion circuitry includes polarization beam splitter circuitry to receive and entangle each of the pair of qubits with arbitrary polarization.

5. The method of claim 4, wherein the entanglement of each of the pair of qubits having different polarization is successful when a polarization discriminating detector detects a single photon.

6. The method of claim 1, further comprising measuring, using quantum measurement circuitry, a qubit associated with a selected quantum node to either remove or bypass the selected node from the quantum network topology.

7. The method of claim 6, wherein the quantum measurement is selected from a Y-measurement and/or a Z-measurement.

8. At least one non-transitory storage device that includes machine-readable instructions that, when executed by one or more processors, cause the one or more processors to perform operations, comprising:
   determine, by one or more processors, a number of quantum nodes, among a plurality of ground-based nodes and a plurality of satellite nodes, to form a desired quantum network topology;
   quantum entangle a pair of qubits, each qubit associated with a respective quantum node that are each included with the quantum network topology;
   couple two quantum nodes, belonging to different network segments, based on quantum entanglement of a respect qubit of each respective node; and
   establish the desired quantum network topology by creating a 2-D cluster based on the coupling of at least two quantum nodes.

9. The at least one non-transitory storage device of claim 8, wherein the number of quantum nodes is based on a task using the desired quantum network topology.

10. The at least one non-transitory storage device of claim 8, wherein the plurality of satellite nodes include a plurality of low-earth orbit (LEO) satellite nodes, a plurality of middle-earth orbit (MEO) satellite nodes, and a plurality of geosynchronous orbit (GEO) satellite nodes, wherein the plurality of ground-based nodes are coupled to the plurality of LEO satellite nodes.

11. The at least one non-transitory storage device of claim 8, the operations further comprising: determine if the entanglement of two independent qubits was successful.

12. The at least one non-transitory storage device of claim 11, wherein the fusion process is repeated until the successful fusion is achieved.

13. The at least one non-transitory storage device of claim 8, the operations further comprising: measure a qubit associated with a selected quantum node to either remove or bypass the selected node from the quantum network topology.

14. The at least one non-transitory storage device of claim 13, wherein the quantum measurement is selected from a Y-measurement and/or a Z-measurement, wherein the Z-measurement removes the node from network topology and Y-measurement bypasses a given node.

\* \* \* \* \*